United States Patent

Fuschetto

[11] 4,226,507
[45] Oct. 7, 1980

[54] THREE ACTUATOR DEFORMABLE SPECIMEN

[75] Inventor: Anthony N. Fuschetto, West Redding, Conn.

[73] Assignee: The Perkin-Elmer Corporation, Norwalk, Conn.

[21] Appl. No.: 55,870

[22] Filed: Jul. 9, 1979

[51] Int. Cl.³ .............................. G02B 5/10; G02B 7/18
[52] U.S. Cl. ..................................................... 350/295
[58] Field of Search ................. 350/295, 310; 343/915

[56] References Cited

U.S. PATENT DOCUMENTS 4,066,343  1/1978  Scott ..................................... 350/295

FOREIGN PATENT DOCUMENTS 1473092  2/1967  France ..................................... 350/310
1475736  4/1967  France ..................................... 350/310
444292   4/1975  U.S.S.R. ................................. 350/310

Primary Examiner—Jon W. Henry
Attorney, Agent, or Firm—Salvatore A. Giarratana; Francis L. Masselle; Edwin T. Grimes

[57] ABSTRACT

A three actuator deformable mirror having a central axis and six attachment points arranged in pairs on diameters of a circle drawn from the axis is supported on a center post on the axis and has a floating block aligned with the axis surrounds the center post with first, second and third actuators disposed along the diameters, each split into two parts and having a first portion extending between the floating block and one of the attachment points on a diameter and the other part extending from the opposite side of said block to the other attachment point on said diameter.

13 Claims, 7 Drawing Figures

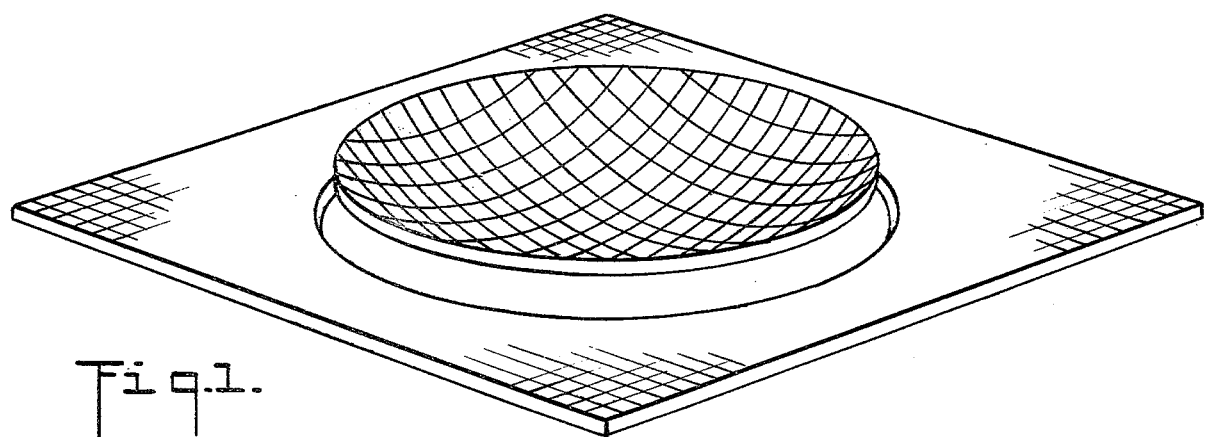
$P_4$ Focus $(2r^2-1)$
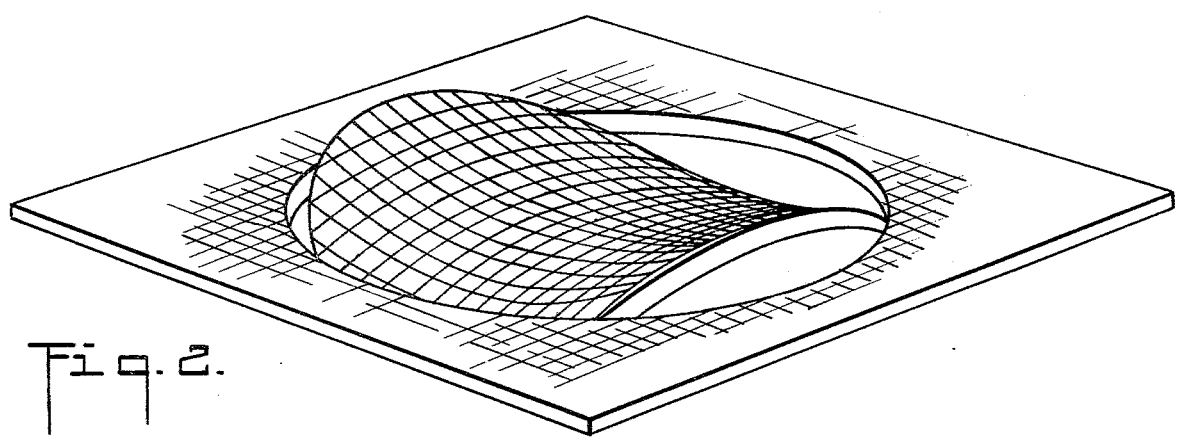
$P_5$ Zero-Degree Third-Order Astigmatism
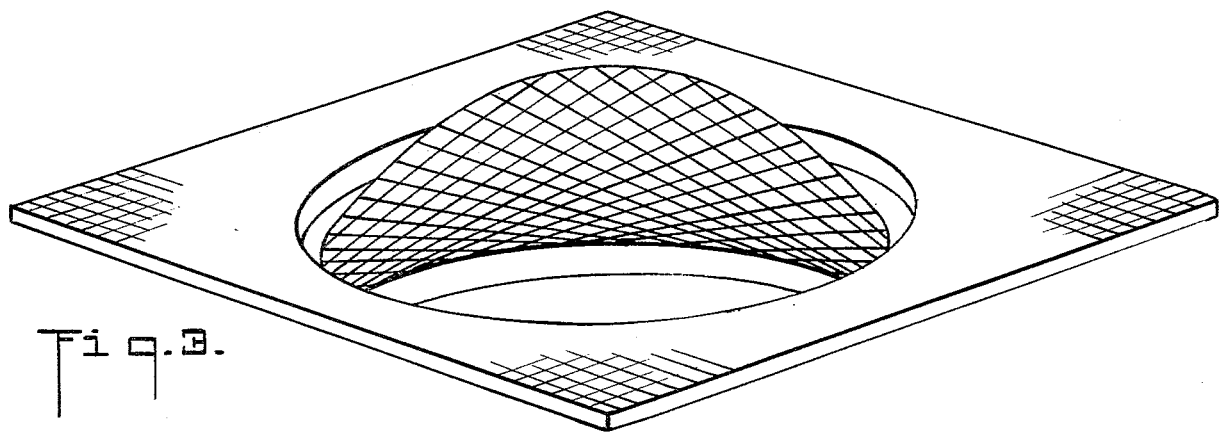
$P_6$ 45-Degree Third-Order Astigmatism U.S. Patent Oct. 7, 1980 Sheet 3 of 3 4,226,507

THREE ACTUATOR DEFORMABLE SPECIMEN

BACKGROUND OF THE INVENTION

This invention relates to the deformation of a planar specimen in general and more particularly to a three actuator deformable mirror.

Various means have been developed for deforming planar specimens such as a flexible mirror. One such arrangement is disclosed in U.S. Application Ser. No. 826,525 now U.S. Pat. No. 4,196,972. This arrangement uses a plurality of posts at different locations beneath the mirror. Such has been the typical manner of obtaining such deformation. However, in U.S. Pat. No. 4,066,343, an arrangement for deforming mirrors with a limited number of actuators is disclosed. This same technique is disclosed by the inventor therein in a paper entitled "New Technique for Controlling Optical Mirror Shapes", published in Optical Engineering, Vol. 14, No. 2, March-April, 1975. Of particular interest is an arrangement utilizing three actuators aligned along three diameters of a circular mirror and crossing at the center thereof. As disclosed in this paper, in such an actuator arrangement, correction for focus and astigmatism becomes possible. Although, the arrangement disclosed therein, in principal, operates quite well, there are certain practical difficulties in constructing a deformable mirror using this technique. Thus, it is the object of this invention to provide a three actuator deformable mirror which is corrected for focus and astigmatism in an optimum manner.

SUMMARY OF THE INVENTION

The present invention accomplishes this object by mounting the mirror to a base with a center post. Along diameters of mirror and located at opposite edges thereof are three sets of mounting points, at which flexure blocks are disposed. Each of the actuators is comprised of a piezo stack, i.e., a stack of piezo electric discs, which is split in two parts, and extends between a flexure block and a floating block arranged so as to surround the center post. At the point of attachment to the floating block central flexures are also provided permitting each piezo stack to hinge freely near the axis of the mirror. This arrangement offers a number of advantages. One in particular is that the piezo stacks can all be contained in the same plane since they do not have to cross each other, all being attached to the same block. Furthermore, the application of all forces in the same plane gives advantages. Various arrangements of the three actuators are possible. For example, they may be along an x, a y and a $\phi$ axis. In such a case, the x and y axes can then be used for focusing purposes to give the mirror a spherical curvature. The remaining actuator is at an angle of 45°, for example, to the x and y axes and can be used to correct for third order astigmatism. However, in the preferred embodiment one actuator is disposed along the y axis and the other two at equal angels thereto. This arrangmenet is mechanically easier to accomodate in a single plane and still permits obtaining the same type of corrections.

BRIEF DESCRIPTION OF THE DRAWINGS

FIG. 1 is a drawing showing the type of distortion needed to accomplish focusing.

FIG. 2 is a similar drawing showing the type of shaping needed for 0° third order astigmatism.

FIG. 3 is a similar view showing curvature for 45° third order astigmatism.

DETAILED DESCRIPTION OF THE DRAWINGS

FIGS. 1-3 illustrate the three types of mode control required to obtain focus and astigmatism correction with only three actuators. the desired contours for defocus $P_4$ and astigmatism $P_5$ and $P_6$ are combinations of Zernike polynomials where:

$P_4 = A_4(2r^2 - 1)$ which is corrected by changing the radius of curvature of the mirror $P_5 = A_5 r^2 \cos 2\theta$ which is corrected by a cylindrical contour at 0°

$P_6 = A_6 r^2 \sin 2\theta$ which is corrected by a cylindrical contour at 45°

If one considers the mirror working at normal incidence, the phase aberration function for focus and astigmatism is equivalent to three cylinders at 0°, 90° and 45° with respect to each other.

Figure 4:
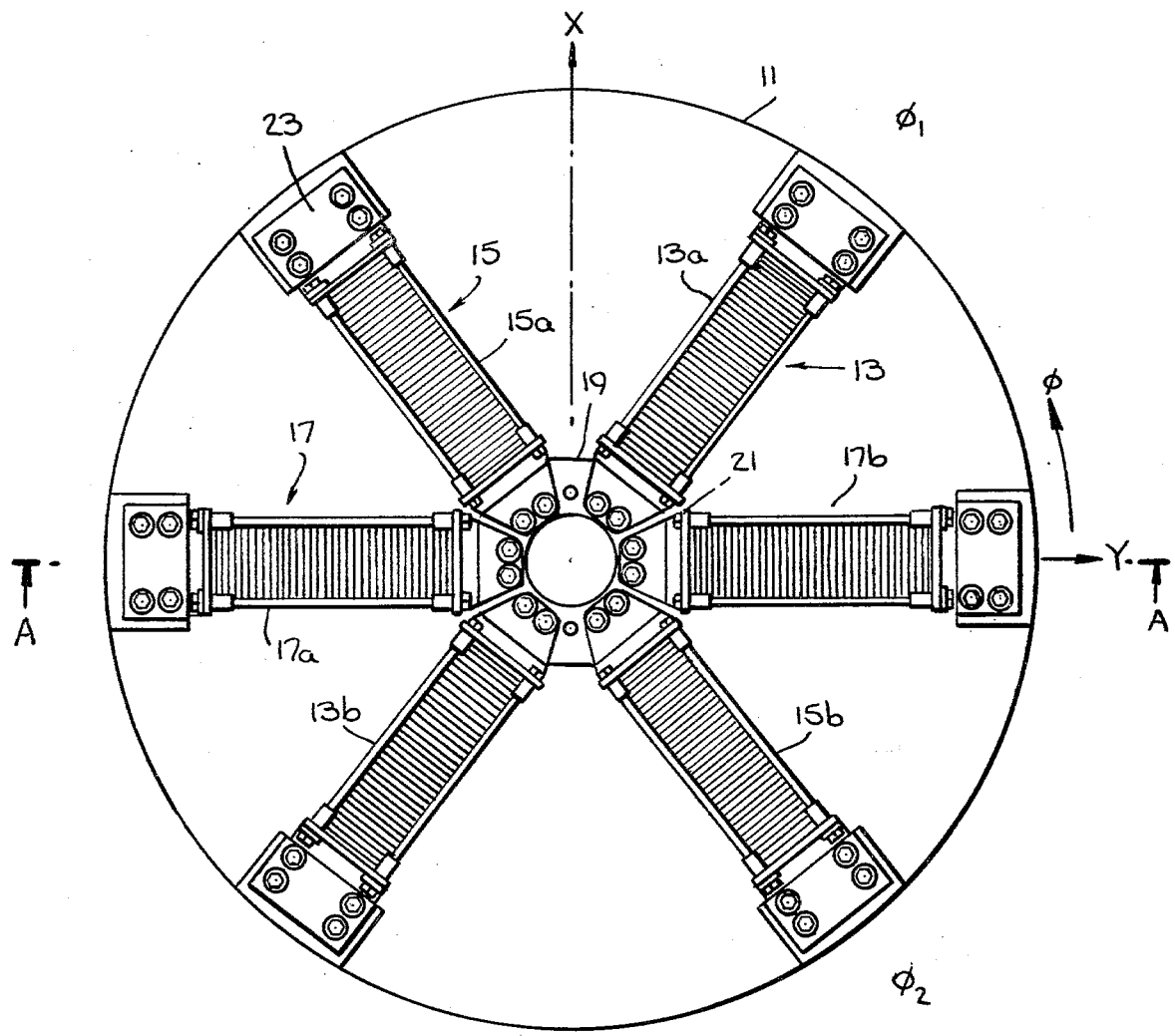
FIG. 4 is a plan view of the actuator arrangement of the present invention.
Figure 5:
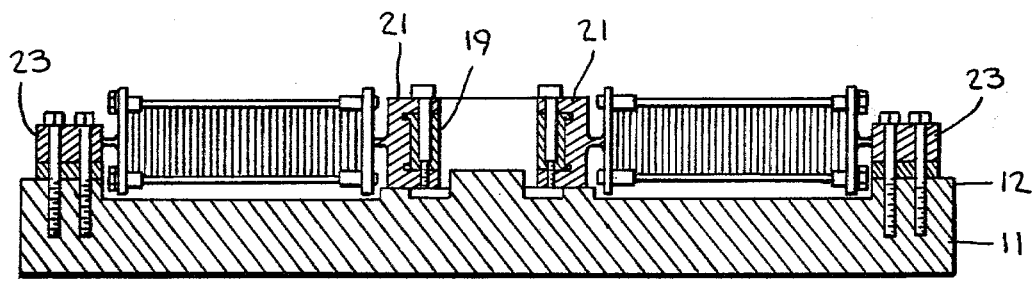
FIG. 5 is an elevation view partially in cross section, of the arrangement of FIG. 4.

In accordance with the present invention this is accomplished by the actuator arrangement illustrated on FIG. 4 and FIG. 5. Shown is a mirror 11 having at its edges appropriate mounting pads 12 formed in the rear surface of the mirror. Three actuators in the form of piezo stacks, i.e., stacks of piezo electric ceramic discs, are provided and designated respectively 13, 15 and 17. The piezo stack 13 is arranged along what is called the $\phi 1$ axis, the piezo stack 15 along what is designated the $\phi 2$ axis and the piezo stack 17 along the y axis. Each piezo stack is split in two and thus piezo stack 13 is made up of sub-stacks 13a and 13b, stack 15, of sub-stacks 15a and 15b, and stack 17 of sub-stacks 17a and 17b. Each of the sub-stacks is connected between a floating block 19 at the center of the mirror and a flexure block 23 which is secured to one of the mounting pads 12. Connection of the piezo stacks to the floating block 19 is by means of a flexure 21.

Axial motions of the actuators 13, 15 and 17 provide equal and opposite bending moments about the edges of the mirror 11 resulting in an almost cylindrical shaped curve of the mirror surface. Since the actuators are eccentric with respect to the neutral axis of the mirror, in addition to the moments at the mirror edge, there are transverse forces acting in tension (push mode) or compression (pull mode). These transverse forces produce negligible deflections since the mirror is a short beam and as a result the bending moments may be assumed to be constant along the length of the beam.

Figure 6:
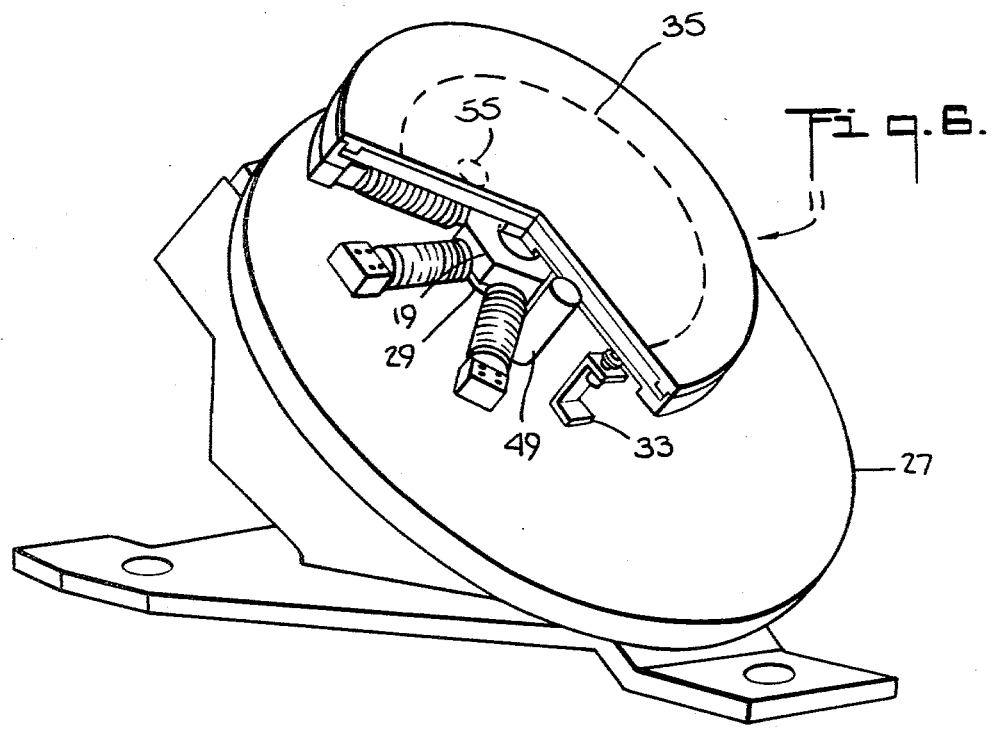
FIG. 6 is a perspective view of a mirror assembly utilizing the present invention.

The equation for bending of the mirror is essentially the same as a cantilever bent by a couple Pe applied at the end, that is:

$R = EI/M$ where
R is radius of curvature
E is modulus of elasticity
I is moment of inertia
M is end moment FIG. 6 is a perspective view of a specific application of the system of the present invention. Shown is a base mount 27 on which the mirror 11 is mounted by means of a center post 29 which passes through a central opening of the floating block 19.

Figure 7:
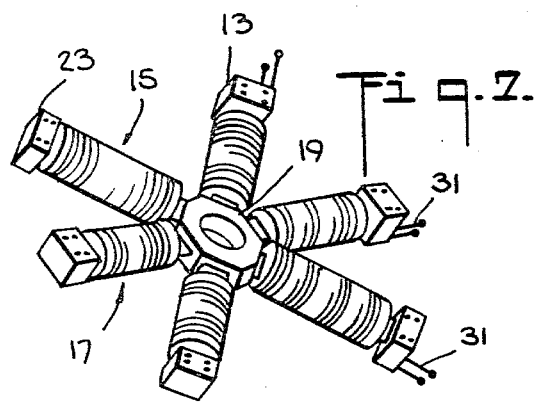
FIG. 7 is a perspective view of the actuator assembly.

FIG. 7 is a perspective view of the actuator assembly alone, illustrating the block 19 along with the piezo stacks and the flexure blocks 23 for attachment to the mirror 11. As indicated, there are leads 31 extending from each of the piezo stacks 13, 15 and 17 for control thereof. Also shown on FIG. 6 are position pickoffs which are disposed at six different places. These pickoffs are placed beneath the edges of a beam print 35 on the mirror.

In the example of FIGS. 6–7, the mirror was a 6 inch diameter, 5/16 inch thick deformable mirror substrate. The piezo electric ceramic actuator assembly shown on FIG. 7 consists of three actuators 13, 15 and 17, each made up to to two in-line stacks with 44 disks per stack joined at the center to the floating block 19 which was made of berylium. The actuators are attached to the back of the mirror by means of single blade flexure members 23. These single blade flexure members along with the single blade flexure members 21 located at the floating berylium block take up in-plane misalignment and act as hinges so as to minimize bending restraint of the mirror. Gluton Industries G1512 piezo-ceramic material was used in the illustrated embodiment. With this material a total swing of plus and minus 30 volts/-mil can be obtained if a dc bias of 15 v/mil is applied in the pulling direction to produce a +45 v/mil positive and 15 v/mil negative swing. The charge coefficient ($d_{33}$) for the G1512 material which is $500 \times 10^{-12 m/v}$ provides a stack stroke capability of plus and minus $9.44 \times 10^{-4}$ inch using a $\pm 1000$ volt supply.

Position pickoffs 33 utilized in the present invention were Kaman Sciences KD 2810-1$\mu$ eddy current type sensor located between the mirror and the base plate. These sense the back surface of the mirror at the foot print 35 of the high powered beam. These position sensors permit cage/closed loop control of the mirror. The resolution repeatability of these sensors over the range of mirror displacements are better than 0.1 $\mu$m. The berylium base plate acts as the reference surface and support member for the deformable mirror by means of the fixed center post 29 and the position pick-offs 33. The closed loop control system used with the mirror of the present invention is beyond the scope of this disclosure and will not be further discussed.

The main criteria in a deformable mirror design is based on achieving, as a minimum, peak to peak wave front corrections of a plus and minus 1 wave defocus and plus and minus one half wave astigmatism acting spearately or simultaneously at 9.27 $\mu$m. These wave front corrections are made in the illustrated embodiment by bending the mirror about the x, y and $\phi$ axes in the manner discussed above. The $\phi$ axis in this particular embodiment is oriented at 37.91 degrees and not 45°. This is done because the deformable mirror is working at an angle with respect to the incident beam in this system in which this mirror was employed. Projecting the 45° astigmatism axis in the plane of the beam onto the elliptical beam print results in a rotation of the cylinder axis from 45° to 37.91. This illustrates the versatility of the system in that the actuators can be properly positioned in an angular sense to accommodate different incident angles.

Various modifications are possible. For example, in the embodiment shown in FIGS. 4 and 5, the actuators 13 and 15 are at equal angels to the actuator 17. To exert a force along the x axis both actuators 13 and 15 must be operated. Alternatively, actuators can be placed along the x, y and $\phi$ axis, for example. In such an embodiment, a slightly different actuation scheme would be required. Furthermore, the actuators can be arranged in two rather than one plane depending on mechanical design configuration. However, better results are obtained with all actuators in the same plane as in the preferred embodiment.

What is claimed is:

1. A three actuator deformable specimen comprising:
   (a) a planar deformable specimen having a central axis and six attachment points arranged in pairs on diameters of a circle drawn from said axis;
   (b) a floating block aligned with said axis;
   (c) first, second and third actuators disposed along said diameters, each actuator split into two parts and having a first portion extending between said central block and one of said attachment points on a diameter and the other part extending from the opposite side of said block to the other attachment point on said diameter.

2. Apparatus according to claim 1 wherein said deformable specimen comprises a deformable mirror.

3. Apparatus according to claim 2 and further including a flexure block attaching each of said actuators at said attachment points.

4. Apparatus according to claim 3 and further including a flexure attaching each of said actuators to said central block.

5. Apparatus according to claim 4 wherein all of said actuators are in the same plane.

6. Apparatus according to claim 5 wherein said first actuator is aligned along an axis designated as a y axis, said second actuator along an x axis perpendicular thereto and said third actuator along an axis at approximately 45° to said y axis.

7. Apparatus according to claim 5 wherein said first actuator is along a diameter lying on what is designated as a y axis and wherein said second and third actuators lie along axes making equal angles with said y axes.

8. Apparatus according to claim 5 and wherein said floating block has a central opening therein and further including a base mount, a center post extending from said base mount through the opening in said floating block and attached to the back of said deformable mirror aligned with said central axis.

9. Apparatus according to claim 8 wherein said actuators comprise stacks of piezo-ceramic disks.

10. Apparatus according to claim 8 wherein said center block is made of beryllium.

11. Apparatus according to claim 8 and further including positioned pickoffs disposed on said base plate behind said mirror for detecting the deflection of said mirror.

12. Apparatus according to claim 11 wherein said position pickoffs comprise eddy current sensors.

13. Apparatus according to claim 11 wherein six position pickoffs are provided located at the footprint of the beam which is being reflected by said mirror.

* * * * *